Feb. 24, 1942.  L. L. HOUCHIN  2,274,143
MULTIFOCAL OPHTHALMIC LENS
Filed Nov. 9, 1940  2 Sheets-Sheet 1

INVENTOR
Lowell L. Houchin.
BY
ATTORNEYS

Patented Feb. 24, 1942

2,274,143

UNITED STATES PATENT OFFICE 2,274,143

MULTIFOCAL OPHTHALMIC LENS

Lowell L. Houchin, Columbus, Ohio, assignor to The Revalens Co., Columbus, Ohio, a corporation of Ohio Application November 9, 1940, Serial No. 365,052

5 Claims. (Cl. 88—54)

My invention relates to multifocal ophthalmic lenses. It has to do, more particularly, with a lens made from a single piece of glass and having a plurality of fields of vision produced by forming areas of different curvature on the surface thereof.

Lenses of this general type are commonly referred to as one-piece lenses. The most common type of multifocal one-piece lens in use at the present time is the one-piece bifocal lens. This lens embodies a single piece of glass which usually has one surface thereof ground in such a manner that areas of different curvature are formed thereon. The lens usually has an outer area which is ground to the proper curvature to serve as the distance portion and an inner area which is ground to a different curvature to serve as the near portion. The near portion or near field has been made in various shapes and is usually located in the lower portion of the lens.

I have found that this type of one-piece lens does not meet all the requirements of a person who ordinarily desires to use the distance portion but frequently desires to use the near portion. For example, storekeepers, doctors, dentists, or persons doing certain types of desk work, who must wear glasses, would prefer to have a distance portion so located in the lens that it would be used in viewing persons on the opposite sides of a desk or counter merely by looking straight ahead. Such a distance portion should be disposed horizontally at the center of the lens and have considerable width but need not have much height. However, since such a person frequently does close work or fairly close work, he would like to have a near vision portion or intermediate vision portion so located that it could be readily used when looking down or up at close objects. For example, when a storekeeper is looking for an article disposed on the shelves of his store, he would desire to have the near vision portion or intermediate vision portion so located that if he looked upwardly to a high shelf or downwardly to a low shelf, the near or intermediate portion could be readily used.

One of the objects of my invention is to provide a one-piece multifocal ophthalmic lens which meets all the requirements discussed in the preceding paragraph.

Another object of my invention is to provide a one-piece lens of the type indicated which is very neat and attractive in appearance.

Another object of my invention is to provide a lens which meets all the requirements previously discussed but which is of such a nature that it may be produced at a comparatively low cost.

In its preferred form, my invention contemplates the provision of a one-piece multifocal ophthalmic lens which is made from a single piece of glass which has substantially the same refractive index throughout its mass. This piece of glass is preferably of concavo-convex form having its convex surface formed with a predetermined curvature throughout its entire area and having separate areas of different curvature formed on the concave surface thereof. These areas of different curvature form the different vision portions of the lens. These different vision portions preferably include an elongated horizontally disposed distance vision portion located substantially at the center of the lens, a near vision portion disposed directly below the elongated distance vision portion, and an intermediate vision portion which surrounds both the near portion and the distance portion. The near vision portion preferably comprises an area slightly greater than a half circle, with the upper edge thereof being substantially flat and lying along the boundary line between the distance vision portion and the near vision portion. The near vision portion is preferably submerged throughout its entire area to minimize the shoulder at the dividing line between the distance vision portion and the near vision portion.

This application is a continuation in part of my application, Serial No. 313,871, filed January 15, 1940.

The preferred embodiment of my invention is illustrated in the accompanying drawings wherein similar characters of reference designate corresponding parts and wherein.

Figure 1:
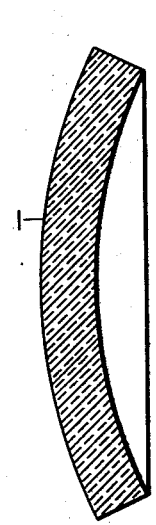
Figure 1 is a vertical sectional view taken through a rough lens blank which may be used in producing my lens.

With reference to the drawings, I illustrate in Figure 1 a rough blank 1 which is preferably formed of glass which has substantially the same index of refraction throughout its entire area. This rough blank 1 is of concavo-convex form.

Figure 2:
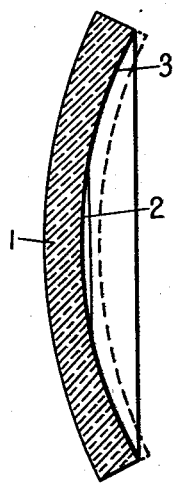
Figure 2 is a similar view showing the lens blank after one surface has been ground to form thereon a centrally disposed circular near vision portion and a surrounding intermediate vision portion.
Figure 3:
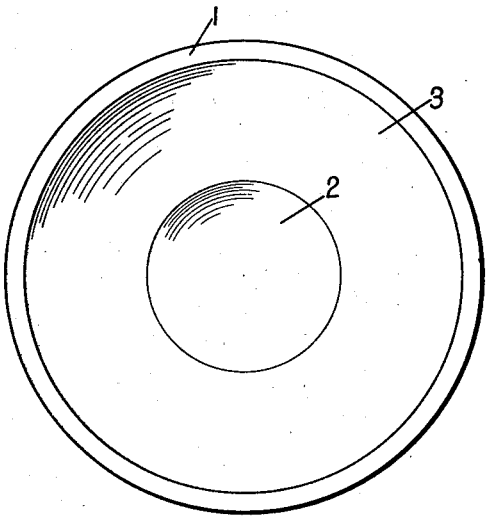
Figure 3 is a plan view of the blank shown in section in Figure 2.

In producing my lens, the first step is to form on the concave surface of the blank 1, an inner centrally disposed circular near vision portion 2 and an outer surrounding intermediate vision portion (Figures 2 and 3). This is accomplished in the usual way by grinding simultaneously two different curves on the surface of the lens blank which produce the vision portions 2 and 3. The curvature of the near vision portion 2 will have a longer radius than the curvature of the intermediate vision portion 3, as is well known. Thus, the near vision portion 2 will be a raised or button-like portion which will have its surface disposed above the surface of the intermediate vision portion 3. The curvatures of the surfaces of the portion 2 and 3 are produced roughly, as the blank is later subjected to a polishing operation.

The next step in producing my lens, is to produce the distance vision portion which is adapted to be formed substantially at the center of the lens blank. This distance vision portion may have various forms. It is preferably elongated and is horizontally disposed in the finished lens so that it will be of considerable width but not of a very great height. It is produced by simultaneously grinding away the upper portion of the inner vision portion 2 and portions of the intermediate vision portion 3 to form an elongated cavity in the blank.

Figure 8:
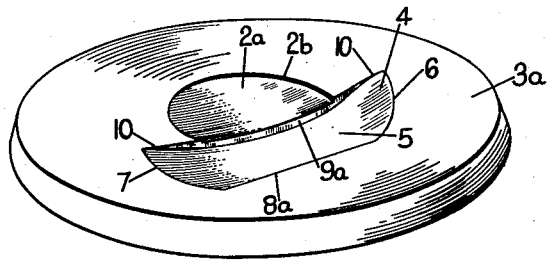
Figure 8 is a perspective view of my completed lens blank, the view being taken from the top edge of the blank to more clearly show the shoulder at the dividing line between the distance vision portion and the near vision portion.

For example, I may produce a lens blank of the type disclosed in Figure 8. This lens blank embodies the outer intermediate vision portion 3a of a suitable curvature, the inner substantially centrally disposed distance vision portion 4, and a near vision portion 2a.

Figure 4:
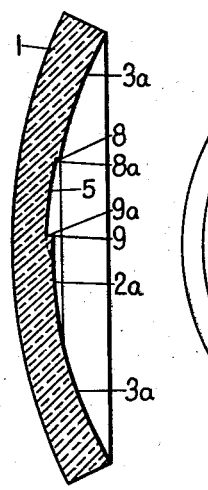
Figure 4 is a view similar to Figure 2 but illustrating the lens blank after a cavity has been ground therein to produce a centrally disposed distance vision portion.
Figure 5:
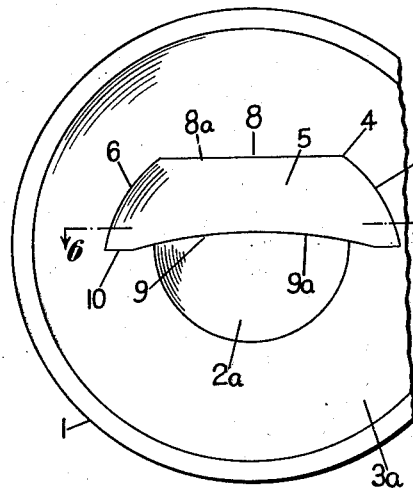
Figure 5 is a plan view of the blank shown in section in Figure 4.
Figure 6:
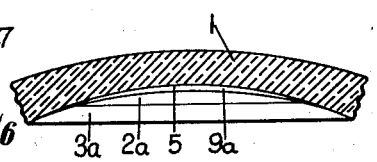
Figure 6 is a horizontal sectional view taken substantially along line 6—6 of Figure 5.

To produce this lens blank illustrated in Figure 8, it is necessary to grind an elongated cavity 5 in the lens blank, as illustrated in Figures 4, 5 and 6. In producing this cavity, the upper portion of the near vision portion 2 is completely eliminated and the portion 2a thereof which remains is of the shape shown in Figure 5. This cavity or slot 5 may be produced by apparatus of the type disclosed in my co-pending application, Serial No. 316,891, filed January 31, 1940.

In producing the cavity 5, the radius of the swinging movement of the grinding tool is adjusted so as to produce a curvature on the bottom of the cavity 5 which is shorter than the radius of curvature of the intermediate vision portion 3 so that the ends 6 and 7 of the cavity will substantially merge with such portion along curved lines and there will be no shoulders at the ends of such cavity. The surface produced on the bottom of the cavity will be a spherical surface. It will be noted that the cavity extends a substantial distance beyond the sides of the near vision portion 2a in order to give the distance vision portion 4 considerable width. The top boundary wall 8 of the cavity may be disposed along a straight substantially horizontally disposed line (Figure 5). The lower boundary wall 9 may be disposed along a line which is upwardly arched slightly and which is joined to the ends 6 and 7 of the cavity by short horizontal portions 10. As illustrated best in Figures 4, 6 and 8, in producing the cavity, which forms the distance vision portion 4, shoulders 8a and 9a are formed at the boundary walls 8 and 9. These shoulders are thickest in the middle and gradually decrease in thickness towards the end of the cavity. The arcuate ends 6 and 7 of the cavity will substantially merge with the adjacent surface of the lens blank as shown in Figure 6. The near vision portion 2a which remains after the cavity is produced will be slightly greater than a semi-circle, as shown in Figure 5, and the boundary line or top of this portion, lying along line 9, will be substantially flat.

Figure 7:
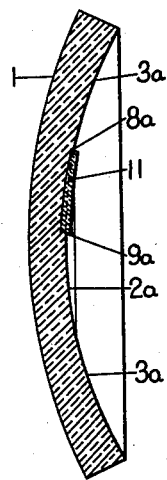
Figure 7 is a vertical sectional view taken through the lens blank of Figure 5 illustrating how a protecting segment of glass may be disposed in the cavity, forming the distance vision portion, during the polishing of the other vision portion.

At the time the cavity 5 is formed in the lens blank, its surface is polished to its final accurate curvature. This curvature will have a shorter radius than the radius of curvature of the surface of the intermediate vision portion 3, as previously described. However, as previously stated, the surfaces of the portions 2 and 3 were merely initially roughly ground to the proper curvature. Consequently, after the distance vision portion 4 is produced, it is necessary to subject the surfaces of the portions 2a and 3a to the final polishing operation. In order to protect the bottom surface of the cavity 5 and the shoulders 8a and 9a, during this polishing operation, the cavity 5 is filled with a protecting segment or wafer of glass 11, as illustrated in Figure 7. As the tool polishes the surfaces of the portions 2a and 3a, the segment or wafer 11 will protect the finished bottom surface of the cavity and the shoulders 8a and 9a.

In order to minimize the shoulder 9a at the dividing line between the near vision portion 2a and the distance vision portion 4, the surface of the near vision portion 2a is ground and polished until the portion 2a is submerged below the surface of the portion 3a throughout its entire area, as shown best in Figure 8. This produces a shoulder 2b along the arcuate boundary of the portion 2a. It will be apparent that with this arrangement, the shoulder 9a will be of a minimum depth and, consequently, the reflection given off by this shoulder will be minimized. When the polishing operation is completed, the segment or wafer 11 may be removed.

Figure 13:
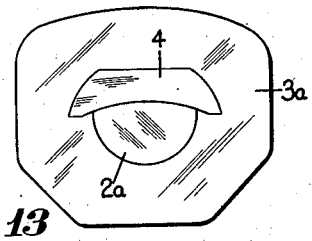
Figure 13 is a plan view of a lens cut from a lens blank made according to my invention.

In cutting the lens from the blank illustrated in Figure 8, it is preferred that it be cut in such a manner (Figure 13) that a substantial portion of the area 3a remains which will completely surround the inner areas. The opposite or convex surface of this lens blank may be finished to the proper corrective curvature for a particular patient prior to the cutting of the lens from the blank. If desired, the protecting segment or wafer 11 may be left in position during the cutting of the lens from the blank and during all the final surfacing operations. Thus, the inner distance portion 4 and the shoulders 8a and 9a will be protected until the lens is finally completed.

This lens will have many advantages. The distance area 4, formed by producing the cavity 5, will have considerable width providing a wide range laterally of the center of the lens blank for distance vision. The curvature of the outer area 3a will not differ to a great degree from that of the area 4. Consequently, when the line of vision passes from one of the areas 3a and 4 to the other, there will not be a great change in focal power. The optical centers of the intermediate vision portion and the distance vision portion preferably lie at the geometrical center of the lens blank. The optical center of the near vision area 2a preferably lies slightly below the line 9 and may coincide with the optical center of the distance vision portion. Consequently, there will be no "jump of the image" or prismatic displacement when the line of vision passes from the distance vision portion 4 into the near vision portion 2a or vice versa. In cutting the lens from the lens blank, it is preferably accomplished in such a manner that the shoulders 8a and 9a are disposed substantially horizontally. It will be apparent that the distance vision portion 4 will be located substantially centrally so that the wearer of the lens when looking directly ahead may look through the area 4. The line of vision may pass from one side to the other of the lens without passing through the near vision portion. However, if the wearer of the lens desires to use the near vision portion, the line of vision may quickly pass downwardly into the near vision portion 2a. The line of vision may pass back and forth between the distance portion 4 and the near portion 2a without passing through the intermediate portion. As previously explained, the height of the shoulder 9a will be minimized by depressing the area 2a. Thus, the amount of reflection at the shoulder will be greatly decreased.

Figure 9:
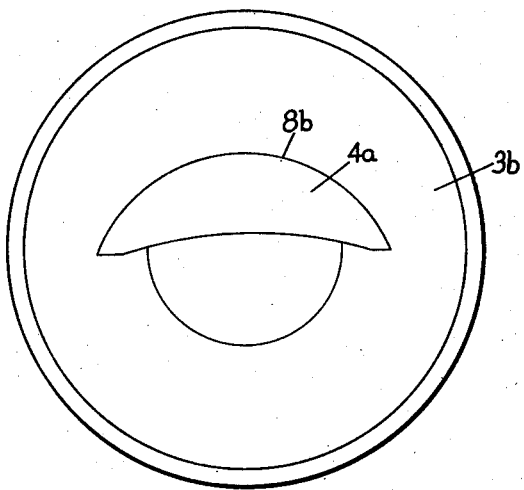
Figure 9 is a plan view of a lens blank made according to my invention but having a distance vision portion of a different shape.

In Figure 9 I have illustrated a lens blank corresponding to Figure 8 with the exception that the distance vision portion 4a has a different outline. The top boundary line 8b of the distance portion, in this instance, may be of arcuate form instead of straight. The distance field may substantially merge with the intermediate field 3b along this line 8b.

Figure 10:
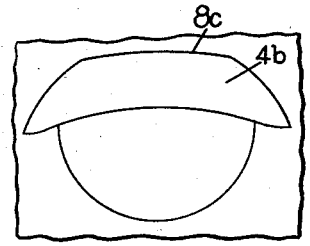
Figure 10 is a plan view of the central portion of a lens blank illustrating a distance vision portion of another shape.

In Figure 10 I have illustrated a distance field 4b which is the same as the distance field 4 of Figure 8. However, in this instance the upper boundary line 8c is slightly arched upwardly. A shoulder will be formed along this upper boundary line as in the form shown in Figure 8.

Figure 11:
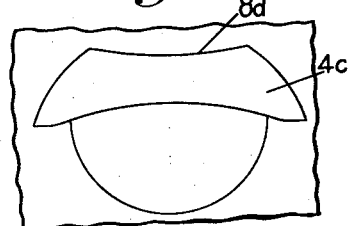
Figure 11 is a similar view illustrating another modified form of distance vision portion.

Figure 11 illustrates a lens blank which is the same as that shown in Figure 10 with the exception that the upper boundary line 8d is downwardly arched.

Figure 12:
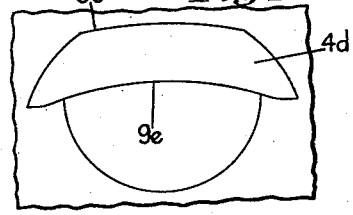
Figure 12 is a similar view illustrating still another modified shape of distance vision portion.

Figure 12 illustrates a lens blank which is exactly the same as that shown in Figure 10 with the exception that the upper shouldered boundary line 8e of the distance vision portion 4d is parallel to the lower boundary line 9e thereof.

It will be apparent that the distance portion may be of many other shapes than those illustrated. It will also be apparent that the reading portion may also have different shapes. However, I prefer that it have the shape illustrated in the drawings.

It will be apparent from the above description that with all forms of my lens, there is provided an elongated horizontally disposed distance vision portion located substantially at the center of the lens, a near vision portion disposed directly below the elongated distance vision portion, and a surrounding outer intermediate vision portion. In each form of the lens, there is a substantially flat dividing line between the inner distance vision portion and the lower near vision portion. Furthermore, the optical center of the near vision portion will be located adjacent the flat dividing line between the near vision portion and the distance vision portion and may even coincide with that of the distance vision portion. Thus, "jump of the image" or prismatic displacement will be eliminated substantially when the line of vision passes from the distance portion to the near vision portion. It is preferred that the optical center of the near vision portion be slightly below the upper substantially flat boundary line thereof. In all forms of my lens blank, the radius of curvature of the surface of the cavity or the distance vision portion is shorter than the radius of curvature of the adjacent surface so that the end of the cavity will merge with the adjacent surface and there will be no shoulders at the ends of the cavity. Furthermore, in all form of my lens, it is preferred that the near vision portion be depressed in order to minimize the height of the shoulder along the upper boundary line thereof.

It will be apparent that my lens will meet all of the requirements set out at the beginning of this description. My lens is very neat and attractive in appearance. It is of such a nature that it may be produced at a comparatively low cost.

Having thus described my invention, what I claim is:

1. A multifocal ophthalmic lens blank formed from a single piece of glass of substantially the same index of refraction throughout, said blank having a major optical surface formed on one side thereof of a suitable curvature, an elongated cavity formed in such surface, the radius of curvature of the bottom of said cavity being shorter than that of the adjacent surface so that the ends of said cavity will substantially merge with the adjacent surface but there will be shoulders formed along both its top and bottom edges, and a cavity formed in said major surface directly below said elongated cavity and having its upper boundary line coinciding with the shouldered lower boundary line of said elongated cavity, the bottom surface of said last-named cavity being disposed at a higher level than that of the elongated cavity so that the dividing line between the two cavities is shouldered.

2. A multifocal ophthalmic lens blank formed from a single piece of glass of substantially the same index of refraction throughout, said blank having a major optical surface formed on one side thereof which is of a suitable curvature, an elongated cavity formed in such surface, the radius of curvature of the bottom of said cavity being shorter than that of the adjacent surface, the lower boundary line of said cavity having a shoulder formed therealong, and a cavity formed in said major surface directly below said elongated cavity and having its upper boundary line coinciding with the shouldered lower boundary line of said elongated cavity, said elongated cavity being of considerably greater width than the lower cavity, the bottom surface of said lower cavity being disposed at a higher level than that of the elongated cavity so that the dividing line between the two cavities is shouldered.

3. A multifocal ophthalmic lens blank formed from a single piece of glass of substantially the same index of refraction throughout, said blank having a major optical surface formed on one side thereof which is of a suitable curvature, an elongated cavity formed in such surface, the lower boundary line of said cavity being substantially flat and having a shoulder formed therealong, and a cavity formed in said major surface directly below said elongated cavity, said last-named cavity being of substantially semi-circular outline and having its upper boundary line coinciding with the substantially flat shouldered lower boundary line of said elongated cavity, said elongated cavity being of considerably greater width than the lower cavity, the bottom surface of said lower cavity being disposed at a higher level than that of the elongated cavity so that the dividing line between the two cavities is shouldered.

4. A multifocal ophthalmic lens blank of the one-piece type comprising a major area having a radius of curvature suitable for it to serve as an intermediate vision portion, an elongated depressed area formed within said major area and having a radius of curvature on its bottom surface suitable for it to serve as a distance vision portion, said depressed area having a shouldered lower boundary line which is substantially flat, and a second depressed area formed within said major area directly below the first depressed area and having a radius of curvature on its bottom surface suitable for it to serve as a near vision portion, said second depressed area being substantially semi-circular in outline and having its upper boundary line coinciding with the shouldered lower boundary line of the first depressed area, said elongated depressed area being of considerably greater width than the lower depressed area, the bottom surface of said lower depressed area being at a higher level than that of the upper elongated depressed area.

5. A multifocal ophthalmic lens blank of the one-piece type comprising a major area having a radius of curvature suitable for it to serve as an intermediate vision portion, an elongated depressed area formed within said major area and having a radius of curvature on its bottom surface suitable for it to serve as a distance vision portion, said depressed area having a shouldered lower boundary line which is substantially flat, an optically surfaced area of a different curvature from the major area and from the surface of said depressed area formed within said major area directly below said depressed area, the radius of curvature of said last-named area being suitable for it to serve as a near vision portion, said last-named area being substantially semi-circular in outline and having its upper boundary line coinciding with the shouldered lower boundary line of said depressed area, said elongated depressed area being of considerably greater width than said lower area.

LOWELL L. HOUCHIN.